(12) United States Patent
Sugimoto et al.

(10) Patent No.: US 11,993,182 B2
(45) Date of Patent: May 28, 2024

(54) MANAGEMENT DEVICE, VEHICLE, MANAGEMENT SYSTEM, METHOD, AND STORAGE MEDIUM STORING A PROGRAM

(71) Applicant: TOYOTA JIDOSHA KABUSHIKI KAISHA, Toyota (JP)

(72) Inventors: Tsuyoshi Sugimoto, Kuwana (JP); Jun Ikeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 375 days.

(21) Appl. No.: 17/521,077

(22) Filed: Nov. 8, 2021

(65) Prior Publication Data

US 2022/0204011 A1    Jun. 30, 2022

(30) Foreign Application Priority Data

Dec. 24, 2020  (JP) ................................. 2020-215495

(51) Int. Cl.
| | | |
|---|---|---|
| *B60W 50/08* | (2020.01) | |
| *B60N 2/02* | (2006.01) | |
| *B60R 16/037* | (2006.01) | |
| *B62D 1/181* | (2006.01) | |

(52) U.S. Cl.
CPC ......... *B60N 2/0273* (2023.08); *B60N 2/0248* (2013.01); *B60R 16/037* (2013.01); *B62D 1/181* (2013.01)

(58) Field of Classification Search
None
See application file for complete search history.

(56) References Cited

U.S. PATENT DOCUMENTS

| | | | |
|---|---|---|---|
| 2014/0052345 A1* | 2/2014 | Tobin | B60R 16/037 701/49 |
| 2015/0197205 A1* | 7/2015 | Xiong | B60R 16/037 701/49 |
| 2019/0023278 A1* | 1/2019 | Lowry | B60W 50/08 |
| 2019/0111938 A1* | 4/2019 | Chen | H04L 41/0806 |
| 2020/0062269 A1* | 2/2020 | Vardharajan | B60W 50/0098 |
| 2020/0122660 A1* | 4/2020 | Liongosari | B60R 21/01552 |
| 2020/0159251 A1* | 5/2020 | Iwasaki | B60R 16/037 |
| 2022/0021737 A1* | 1/2022 | Fan | B60G 17/02 |

FOREIGN PATENT DOCUMENTS

| | | | | |
|---|---|---|---|---|
| CN | 110588551 A | | 12/2019 | |
| CN | 111583444 A | | 8/2020 | |
| CN | 111634213 A | | 9/2020 | |
| DE | 102017010110 A1 | * | 4/2019 | ........... G06F 21/629 |
| JP | 2005022599 A | * | 1/2005 | ............ B60R 16/02 |
| JP | 2019-34684 A | | 3/2019 | |
| WO | WO-2019182604 A1 | * | 9/2019 | ........... B60R 16/037 |

* cited by examiner

*Primary Examiner* — Amelia Vorce
(74) *Attorney, Agent, or Firm* — Oblon, McClelland, Maier & Neustadt, L.L.P.

(57) ABSTRACT

A management device includes a processor. The processor is configured to acquire setting information for onboard equipment used by a user in a vehicle, vehicle model information for the vehicle, and identification information for the user, convert the setting information that has been acquired into new setting information based on the vehicle model information, and provide the new setting information to onboard equipment used by the user corresponding to the identification information in a new vehicle.

9 Claims, 17 Drawing Sheets

MANAGEMENT DEVICE, VEHICLE, MANAGEMENT SYSTEM, METHOD, AND STORAGE MEDIUM STORING A PROGRAM

CROSS-REFERENCE TO RELATED APPLICATION

This application is based on and claims priority under 35 USC 119 from Japanese Patent Application No. 2020-215495 filed on Dec. 24, 2020, the disclosure of which is incorporated by reference herein.

BACKGROUND

Technical Field

The present disclosure relates to a management device, a vehicle, a management system, a method, and a storage medium storing a program.

Related Art

Japanese Patent Application Laid-Open (JP-A) No. 2019-34684 discloses an onboard equipment control system in which settings and software information for onboard equipment of a user's own car are transferred to a car-share vehicle in a car-share system.

Information regarding seat positions and door mirror angles can be transferred as settings for onboard equipment.

However, in the system disclosed in JP-A No. 2019-34684, these settings are transferred over as-is, even in cases in which the vehicle models of the vehicles between which the onboard equipment settings are transferred are different to one another, with the result that the driving position cannot be appropriately replicated.

SUMMARY

An object of the present disclosure is to replicate onboard equipment settings unconstrained by vehicle model in cases in which onboard equipment settings are transferred between different vehicles.

A management device of a first aspect includes an acquisition section configured to acquire setting information for onboard equipment used by a user in a vehicle, vehicle model information for the vehicle, and identification information for the user, a conversion section configured to convert the setting information that has been acquired into new setting information based on the vehicle model information, and a provision section configured to provide the new setting information converted by the conversion section to onboard equipment used by the user corresponding to the identification information in a new vehicle.

The management device of the first aspect converts the setting information of the onboard equipment used by the user into the new setting information based on the vehicle model information, and provides the new setting information to the new vehicle. The setting information is setting information for the onboard equipment used by the user, and may for example be position information indicating a seat adjustment position or position information indicating a steering column adjustment position. The vehicle model information is information for identifying the vehicle model, and may for example be a vehicle model code. The identification information is information for identifying the user, and may for example be a pre-registered user ID, or information relating to a user account. The management device of the first aspect enables onboard equipment settings to be replicated unconstrained by vehicle model in cases in which onboard equipment settings are transferred between different vehicles.

A management device according to a second aspect is the management device of the first aspect, wherein the acquisition section is configured to acquire information regarding a movable range of the onboard equipment as the vehicle model information, and the conversion section is configured to convert the setting information to the new setting information using a proportional ratio of a parameter of the setting information with respect to the movable range of the onboard equipment.

According to the management device of the second aspect, employing a proportional ratio representing the onboard equipment setting information with respect to the movable range of the onboard equipment enables the onboard equipment settings to be replicated unconstrained by vehicle model, even in cases in which equivalent onboard equipment has different movable ranges depending on the vehicle model.

A management device according to a third aspect is the management device of the second aspect, wherein the acquisition section is configured to acquire a position on a first axis and a position on a second axis intersecting the first axis, as parameters relating to the setting information, and the conversion section is configured to convert the setting information into the new setting information using a proportional ratio of the first axis position with respect to a movable range on the first axis and a proportional ratio of the second axis position with respect to a movable range on the second axis.

The management device of the third aspect splits the setting information into the mutually intersecting first axis and second axis, and employs proportional ratios with respect to the movable ranges on the respective axes in order to convert the setting information into the new setting information. Thus, for onboard equipment with a movable range defined by directions in two dimensions, the setting information can be converted into the new setting information while taking into consideration differences in the movable ranges between vehicle models. For example, in the case of an adjustment position of onboard equipment that is capable of moving in two directions, a first axis and a second axis can be set according to the respective movable directions. This enables the onboard equipment settings to be replicated unconstrained by vehicle model in consideration of the differing movable ranges in each movable direction between vehicle models. Alternatively, a coordinate system may be set with respect to the onboard equipment independently of the movable directions. In such cases, the onboard equipment settings can be replicated unconstrained by the vehicle model in consideration of the differing movable ranges between vehicle models using the independent coordinate system.

A management device according to a fourth aspect is the management device of any one of the first aspect to the third aspect, wherein the acquisition section is configured to acquire vehicle model information of the new vehicle, the conversion section is configured to convert the setting information that has been acquired into setting information for application to the onboard equipment of the new vehicle by employing the vehicle model information of the new vehicle in the conversion based on the vehicle model information, and the provision section is configured to provide the onboard equipment of the new vehicle with the setting information for application to the onboard equipment of the new vehicle.

The management device of the fourth aspect converts the onboard equipment setting information set in one vehicle to setting information for application in a new vehicle in consideration of not only the vehicle model information of the one vehicle but also the vehicle model information of the new vehicle to which the setting information is to be transferred. This enables the setting information provided from the management device to be replicated as-is in the onboard equipment of the new vehicle, without requiring further processing to convert the setting information for application in the new vehicle.

A management device according to a fifth aspect is the management device of the fourth aspect, wherein the provision section provides the setting information to the onboard equipment of the new vehicle without the conversion section executing conversion processing on the setting information in a case in which the vehicle model information of the vehicle and the vehicle model information of the new vehicle are the same.

According to the management device of the fifth aspect, in a case in which the vehicle model information of the vehicle and the vehicle model information of the new vehicle are the same, the setting information is transferred to the onboard equipment of the new vehicle without executing conversion processing on the setting information. This enables the computational load on the management device to be lessened.

A management device according to a sixth aspect is the management device of any one of the first aspect to the fifth aspect, wherein in a case in which the acquisition section has acquired modified setting information that has been modified by changing a setting of the onboard equipment from the onboard equipment of the new vehicle applied with the new setting information, the conversion section updates a conversion logic based on the modified setting information.

According to the management device of the sixth aspect, in a case in which the user further modifies the onboard equipment setting information after the onboard equipment setting information has been converted and transferred between different vehicle models, the conversion logic is updated. By applying conversion logic that has been optimized based on such user modifications to the setting information for the onboard equipment, the management device enables user burden in readjusting the onboard equipment to be alleviated.

A seventh aspect is a vehicle including the management device of any one of the first aspect to the sixth aspect.

The vehicle of the seventh aspect employs the vehicle model information in in-vehicle conversion of the setting information of the onboard equipment used by the user into the new setting information. This enables onboard equipment settings to be replicated unconstrained by vehicle model in cases in which onboard equipment settings are transferred between different vehicles.

An eighth aspect is a management system including the management device of any one of the first aspect to the sixth aspect, and plural of the vehicles, which perform communication with the management device. The acquisition section is configured to acquire the vehicle model information, the setting information, and the identification information from the plural of vehicles by communication with the plural of vehicles, and to acquire the vehicle model information for the new vehicle and the identification information from the new vehicle by communication with the new vehicle, and the provision section is configured to provide the onboard equipment of the new vehicle with the new setting information that has been converted by the conversion section by communication with the new vehicle.

In the management system of the eighth aspect, the management device converts onboard equipment setting information for one vehicle between different vehicles based on the vehicle model information, enabling the converted setting information to be provided to a new vehicle that is different to the one vehicle. This enables onboard equipment settings to be replicated unconstrained by vehicle model in cases in which onboard equipment settings are transferred between different vehicles.

A ninth aspect is a method by which a computer executes processing, the processing including acquisition processing to acquire setting information for onboard equipment used by a user in a vehicle, vehicle model information for the vehicle, and identification information for the user, conversion processing to convert the setting information that has been acquired into new setting information based on the vehicle model information, and provision processing to provide the new setting information converted by the conversion processing to onboard equipment used by the user corresponding to the identification information in a new vehicle.

In the method of the ninth aspect, the computer converts the setting information of the onboard equipment used by the user into the new setting information based on the vehicle model information. This enables onboard equipment settings to be replicated unconstrained by vehicle model in cases in which onboard equipment settings are transferred between different vehicles.

A tenth aspect is a non-transitory storage medium storing a program. The program includes acquisition processing to acquire setting information for onboard equipment used by a user in a vehicle, vehicle model information for the vehicle, and identification information for the user, conversion processing to convert the setting information that has been acquired into new setting information based on the vehicle model information, and provision processing to provide the new setting information converted by the conversion processing to onboard equipment used by the user corresponding to the identification information in a new vehicle.

The program of the tenth aspect causes a computer to convert the setting information of the onboard equipment used by the user into the new setting information based on the vehicle model information. This enables onboard equipment settings to be replicated unconstrained by vehicle model in cases in which onboard equipment settings are transferred between different vehicles.

As described above, the management device, vehicle, management system, program, and method according to the present disclosure are capable of replicating onboard equipment settings unconstrained by vehicle model in cases in which onboard equipment settings are transferred between different vehicles.

BRIEF DESCRIPTION OF THE DRAWINGS

Exemplary embodiments of the present disclosure will be described in detail based on the following figures, wherein.

DETAILED DESCRIPTION

Figure 1:
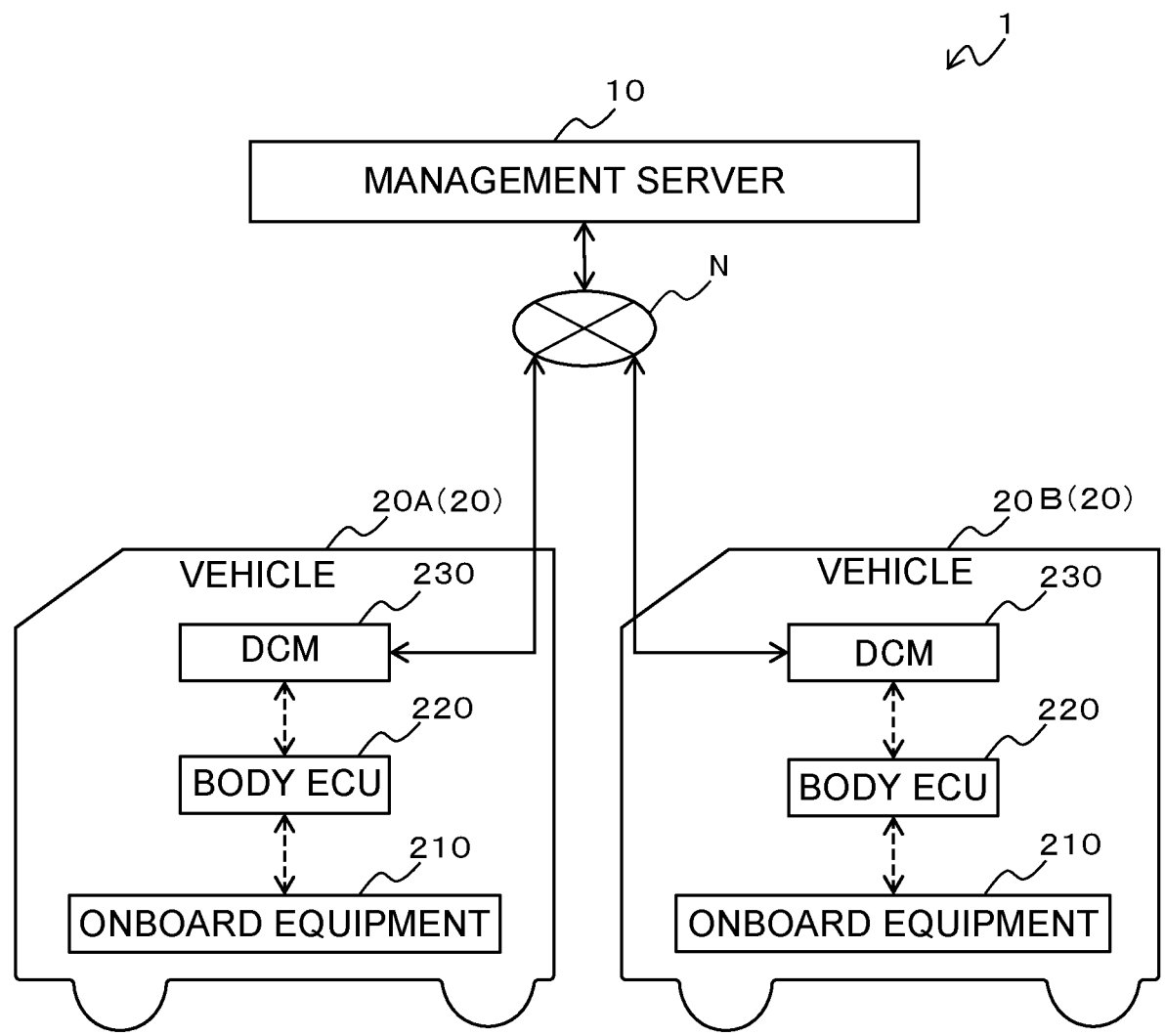
FIG. 1 is a diagram illustrating a schematic configuration of a management system according to a first exemplary embodiment.

Explanation follows regarding specific exemplary embodiments of the present disclosure, with reference to the drawings. Note that the front and rear, up and down, and left and right directions indicated in the drawings are respectively aligned with a vehicle front-rear direction, a vehicle vertical direction, and left and right in a vehicle width direction. Unless specifically stated otherwise, the placement and so on of the configuration elements described in the exemplary embodiments are not to be construed as limitations to the technical scope of the present invention.

First Exemplary Embodiment

Explanation follows regarding a management system 1 according to a first exemplary embodiment. FIG. 1 is a diagram illustrating a schematic configuration of the management system according to the present exemplary embodiment. The management system 1 includes a management server 10 serving as a management device, and plural vehicles 20. Each of the vehicles 20 includes a data communication module (DCM) 230 configured to be capable of communicating with the management server 10 over a network N. The network N is implemented by wireless communication, and a communication protocol such as 5G, LTE, or Wi-Fi (registered trademark) may be employed therefor.

Vehicle Configuration

Figure 2:
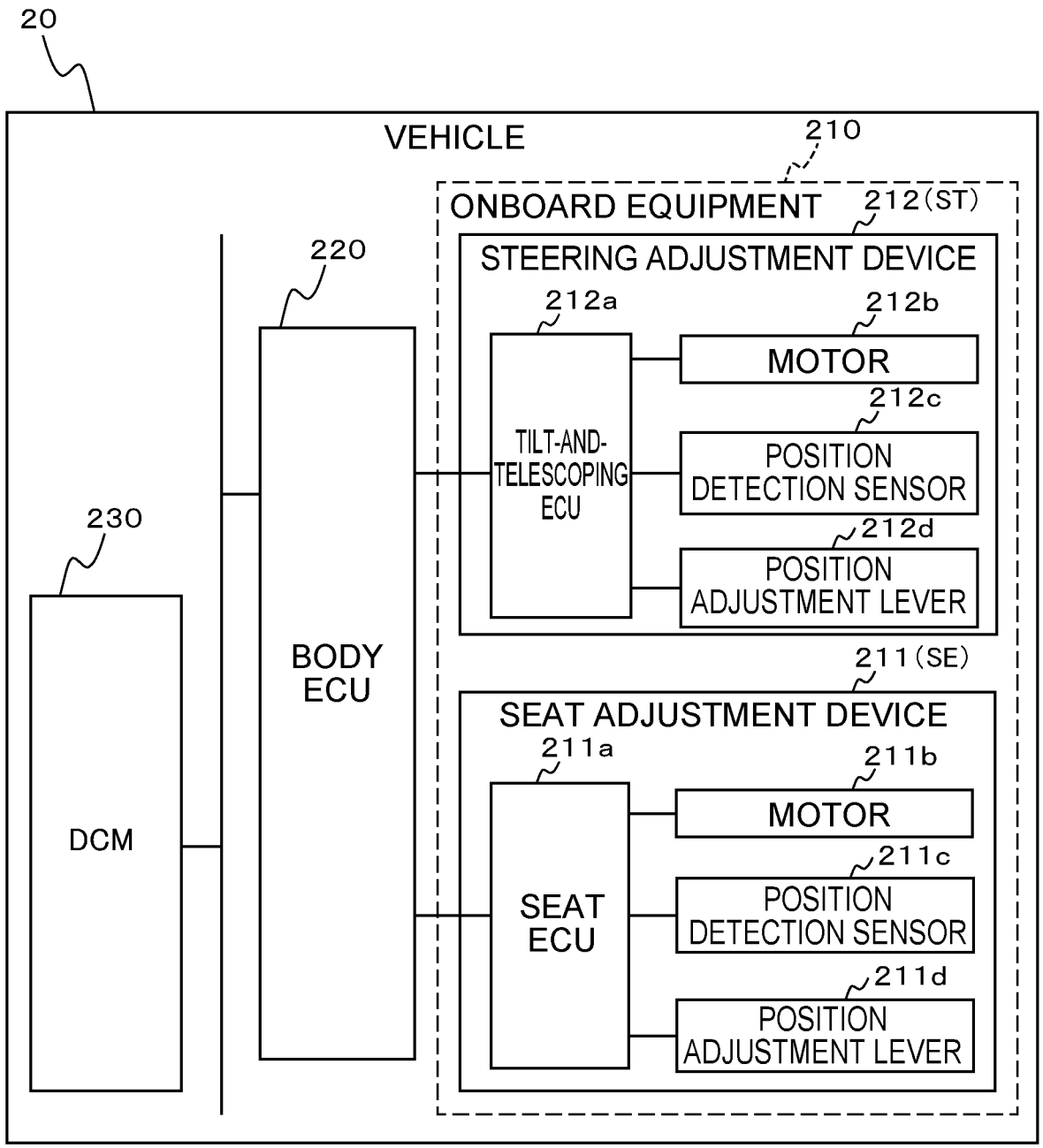
FIG. 2 is a block diagram illustrating a hardware configuration of a vehicle of the first exemplary embodiment.

Explanation follows regarding configuration of the vehicles 20, with reference to FIG. 2. Each of the vehicles 20 includes a seat adjustment device 211 and a steering adjustment device 212 serving as onboard equipment 210, a body ECU 220 serving as a control device that controls the onboard equipment 210, and the DCM 230.

Explanation follows regarding the seat adjustment device 211 and the steering adjustment device 212 that serve as the onboard equipment 210.

The seat adjustment device 211 is a device used to adjust the position of a seat SE of the vehicle 20. The seat adjustment device 211 includes a seat ECU 211a, a motor 211b, a position adjustment lever 211d, and a position detection sensor 211c. The motor 211b, the position adjustment lever 211d, and the position detection sensor 211c are all electrically connected to the seat ECU 211a. The entire seat is movable in the front-rear direction and the vertical direction. The motor 211b is built into the seat SE and is controlled by the seat ECU 211a in order to move the seat SE in the front-rear direction and the vertical direction.

The position adjustment lever 211d is a switch that can be pushed and pulled by a user in directions respectively corresponding to the front-rear direction and the vertical direction. An operation amount of the position adjustment lever 211d by the user is input to the seat ECU 211a, and the seat ECU 211a controls the motor 211b in accordance with the operation amount of the position adjustment lever 211d by the user. Alternatively, position adjustment using the position adjustment lever 211d may be performed manually, without the use of the motor 211b.

The position detection sensor 211c detects a front-rear position and a vertical position of the seat SE. The positions detected by the position detection sensor 211c are output to the seat ECU 211a. The seat ECU 211a outputs the front-rear position and the vertical position of the seat SE to the body ECU 220 as position information. As an example, this position information reflects front-rear direction sliding displacement and vertical direction displacement of the seat SE with respect to a reference position.

The steering adjustment device 212 is a device used to adjust the position of a steering column ST. The steering adjustment device 212 includes a tilt-and-telescoping ECU 212a, a motor 212b, a position adjustment lever 212d, and a position detection sensor 212c. The motor 212b, the position adjustment lever 212d, and the position detection sensor 212c are all electrically connected to the tilt-and-telescoping ECU 212a. A tilt position (inclination with respect to the vertical direction and the left-right direction) and a telescopic position (extension-retraction direction position) of the steering column ST are adjustable. The motor 212b is built into the steering column ST, and is controlled and driven by the tilt-and-telescoping ECU 212a in order to move the tilt position and the telescopic position of the steering column ST.

The position adjustment lever 212d is a switch that can be pushed and pulled by user input in directions respectively corresponding to the tilt position and the telescopic position of the steering column ST. An operation amount of the position adjustment lever 212d by the user is input to the tilt-and-telescoping ECU 212a, and the tilt-and-telescoping ECU 212a controls the motor 212b in accordance with the operation amount of the position adjustment lever 212d by the user. Alternatively, position adjustment using the position adjustment lever 212d may be performed manually, without the use of the motor 212b.

The position detection sensor 212c of the steering column ST detects the tilt position and the telescopic position of the steering column ST. The positions detected by the position detection sensor 212c are output to the tilt-and-telescoping ECU 212a. The tilt-and-telescoping ECU 212a outputs the tilt position and the telescopic position of the steering column ST to the body ECU 220 as position information. As an example, this position information reflects tilt direction displacement and telescopic direction displacement with respect to a reference position.

The body ECU 220 includes functionality to manage the position information for the seat SE and the position information for the steering column ST. Hereafter, position information for the seat SE is referred to as seat position information, and position information for the steering column ST is referred to as column position information. This management involves, for example, the acquisition, provision, and storage of the seat SE and column position information coordinated with the seat ECU 211a, the tilt-and-telescoping ECU 212a, and the DCM 230.

The body ECU 220 stores a user ID serving as identification information for the user, and a vehicle model code serving as vehicle model information for the vehicle 20. The user ID is information preset for each user, and is employed to identify the user. The user ID may be acquired by wireless communication with a terminal device in the possession of the user. Alternatively, the user ID may be stored in the body ECU 220 when the vehicle 20 is purchased. The vehicle model code is information preset for each vehicle 20 model, and is employed to identify the vehicle model of the vehicle 20. The vehicle model code may be stored in the body ECU 220 during manufacture of the vehicle 20. The body ECU 220 outputs the user ID and the vehicle model code to the DCM 230, described below. Note that although the user ID and the vehicle model code are stored in the body ECU 220 in the present exemplary embodiment, they may be stored in the DCM 230, described below.

The DCM 230 is an onboard communication unit for communicating with the management server 10 over the network N, and serves as an example of an onboard communication device.

The DCM 230 includes functionality to exchange the user ID, the vehicle model code, and position information with the management server 10.

Hardware Configuration of Management Server

Figure 3:
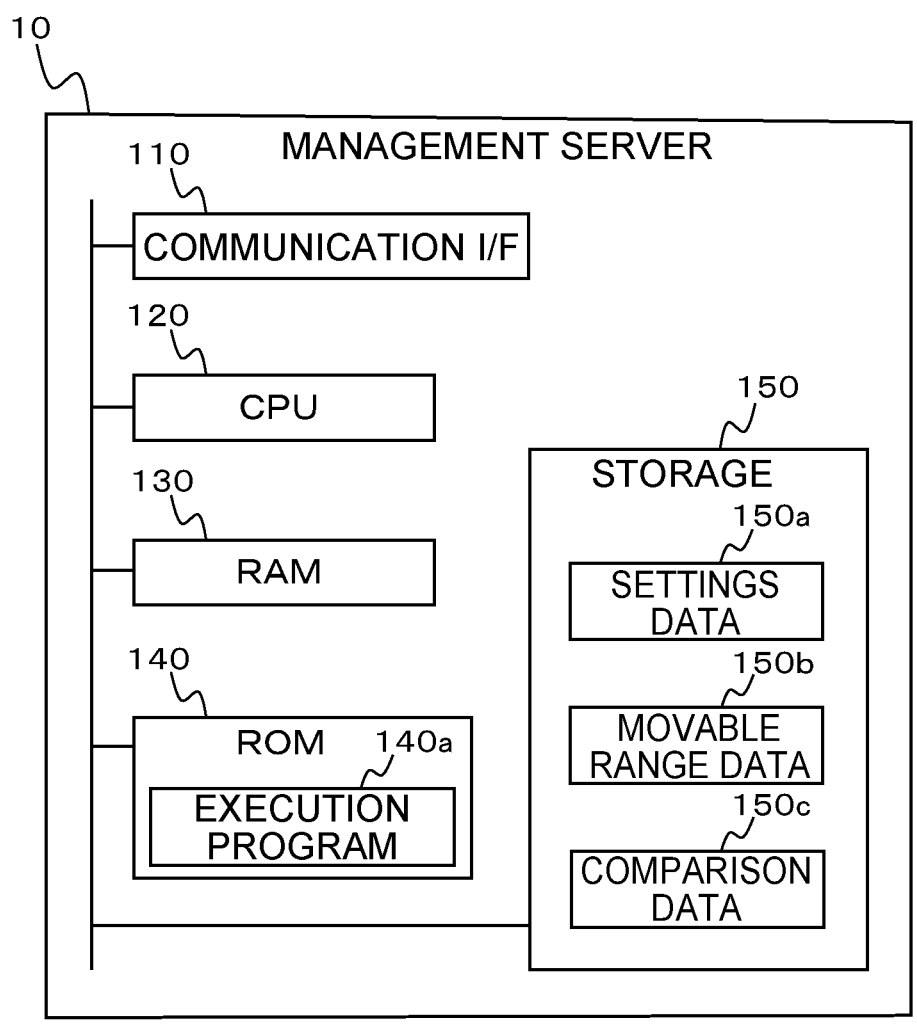
FIG. 3 is a block diagram illustrating a hardware configuration of a management server of the first exemplary embodiment.

Explanation follows regarding a hardware configuration of the management server 10, with reference to FIG. 3. The management server 10 is configured including a communication I/F 110, a CPU 120, RAM 130, ROM 140, and storage 150. The communication I/F 110, the CPU 120, the RAM 130, the ROM 140, and the storage 150 are connected so as to be capable of communicating with each other through an internal bus.

The CPU 120 is a central processing unit that executes various programs and controls various sections. Namely, the CPU 120 reads a program from the ROM 140, and executes the program using the RAM 130 as a workspace. In the present exemplary embodiment, an execution program 140a is stored in the ROM 140. The RAM 130 acts as a workspace that temporarily stores the execution program 140a and other data.

Figure 4:
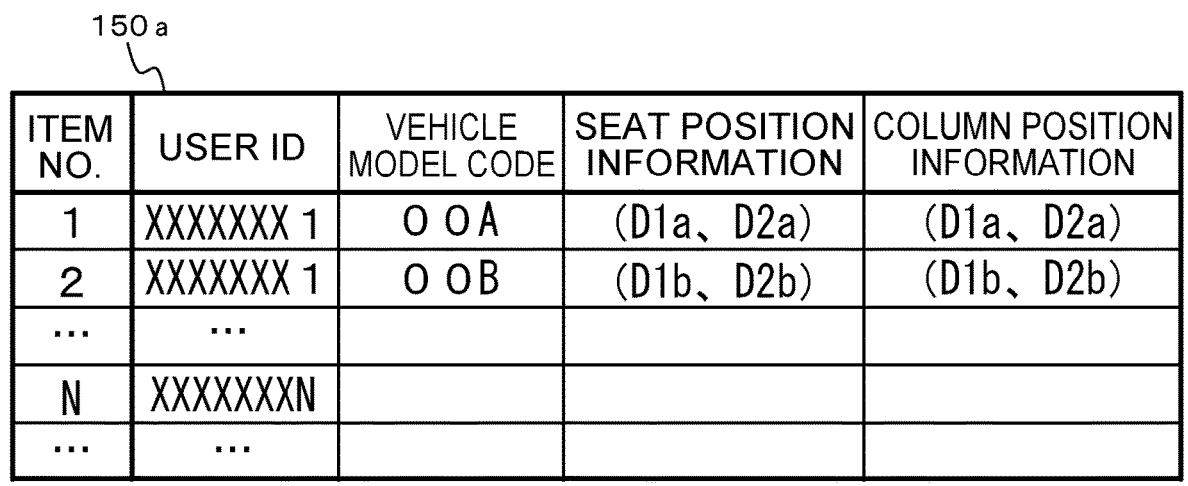
FIG. 4 is a schematic diagram illustrating settings data for onboard equipment stored in storage of a management server of the first exemplary embodiment.

Settings data 150a, movable range data 150b, and comparison data 150c for the onboard equipment 210 are stored in the storage 150 in the present exemplary embodiment. FIG. 4 is a schematic diagram illustrating an example of the settings data 150a for the onboard equipment 210. The settings data 150a for the onboard equipment 210 is information in which user IDs, vehicle model codes, seat position information, and column position information received from the vehicles 20 through the communication I/F 110 are associated with each other. As illustrated in FIG. 4, seat position information and column position information corresponding to a vehicle model code 00A for a user with the user ID xxxxxxx1 is stored as item number 1. Moreover, seat position information and column position information corresponding to a vehicle model code 00B for the same user ID as item number 1 is stored as item number 2. The movable range data 150b is information relating to a movable range of the seat SE and a movable range of the steering column ST, these being preset for each vehicle model of the vehicles 20. The comparison data 150c is information relating to a comparison between position information provided to a new vehicle 20 and position information that has been modified in the new vehicle 20 subsequently to the provision of the position information.

The communication I/F 110 is an interface for connecting to the network N.

In the present exemplary embodiment, the CPU 120 reads the execution program 140a from the ROM 140 and executes the execution program 140a using the RAM 130 as a workspace.

Functional Configuration of Management Server

Figure 5:
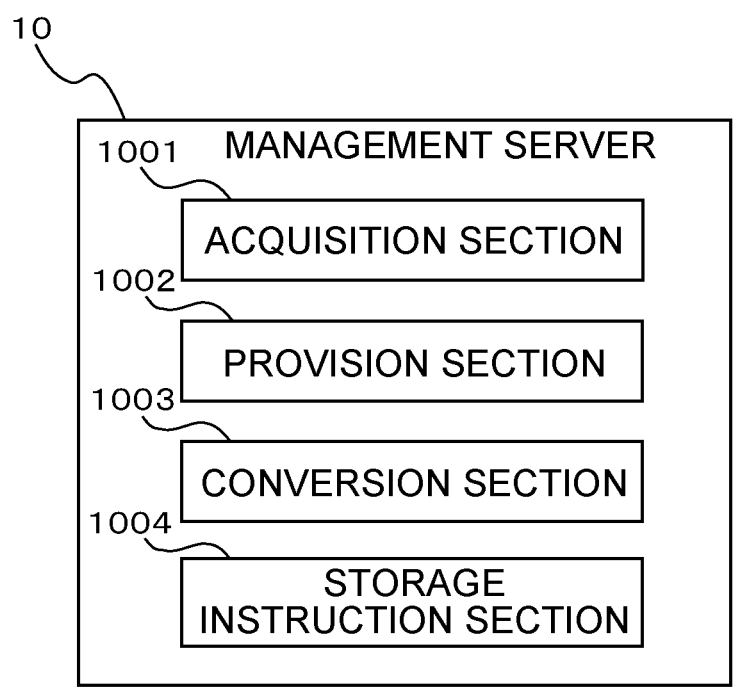
FIG. 5 is a block diagram illustrating an example of functional configuration of a management device of the first exemplary embodiment.

Explanation follows regarding a functional configuration of the management server 10, with reference to FIG. 5. The management server 10 includes an acquisition section 1001, a provision section 1002, a conversion section 1003, and a storage instruction section 1004. The acquisition section 1001, the provision section 1002, the conversion section 1003, and the storage instruction section 1004 are functional configuration elements implemented by the execution program 140a stored in the ROM 140 being read into the RAM 130 and executed by the CPU 120.

The acquisition section 1001 and the provision section 1002 respectively acquire and provide information by communicating with the vehicles 20 through the communication OF 110. The acquisition section 1001 acquires the user ID, vehicle model code, and seat position information and column position information for the vehicle 20 from the respective vehicles 20. In the case of a new vehicle 20, the acquisition section 1001 acquires only the user ID and vehicle model code. The provision section 1002 provides seat position information and column position information that have been converted for a new vehicle 20 by the conversion section 1003, described later, to the new vehicle 20.

The storage instruction section 1004 causes the user ID, the vehicle model code of the vehicle 20, and the seat position information and the column position information for the vehicle 20 as acquired by the acquisition section 1001 from the respective vehicles 20 to be stored in the storage 150.

The conversion section 1003 uses conversion logic, described later, to execute conversion processing to convert seat position information and column position information for one vehicle 20 into seat position information and column position information for a new vehicle 20.

After the seat position information and column position information for the new vehicle 20 have been transmitted to the new vehicle 20, the acquisition section 1001 later acquires seat position information and column position information from the new vehicle 20. In cases in which the seat position information and column position information for the new vehicle 20 acquired from the new vehicle 20 differ from the seat position information and column position information provided to the new vehicle 20 following conversion by the conversion section 1003, the conversion section 1003 executes correction processing to correct the conversion logic.

Control Flow

Figure 6:
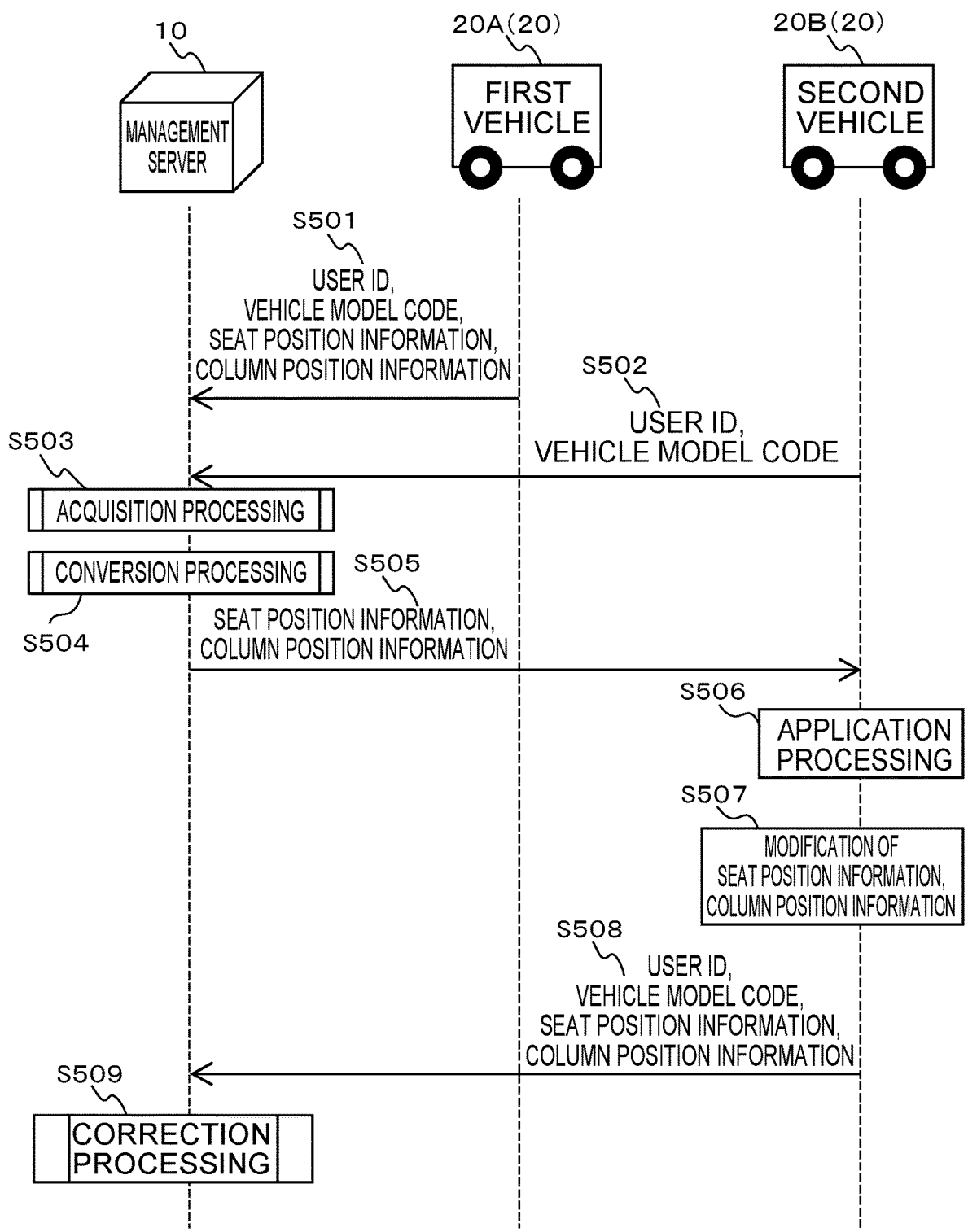
FIG. 6 is a system sequence chart illustrating a flow of management processing of the first exemplary embodiment.
Figure 7:
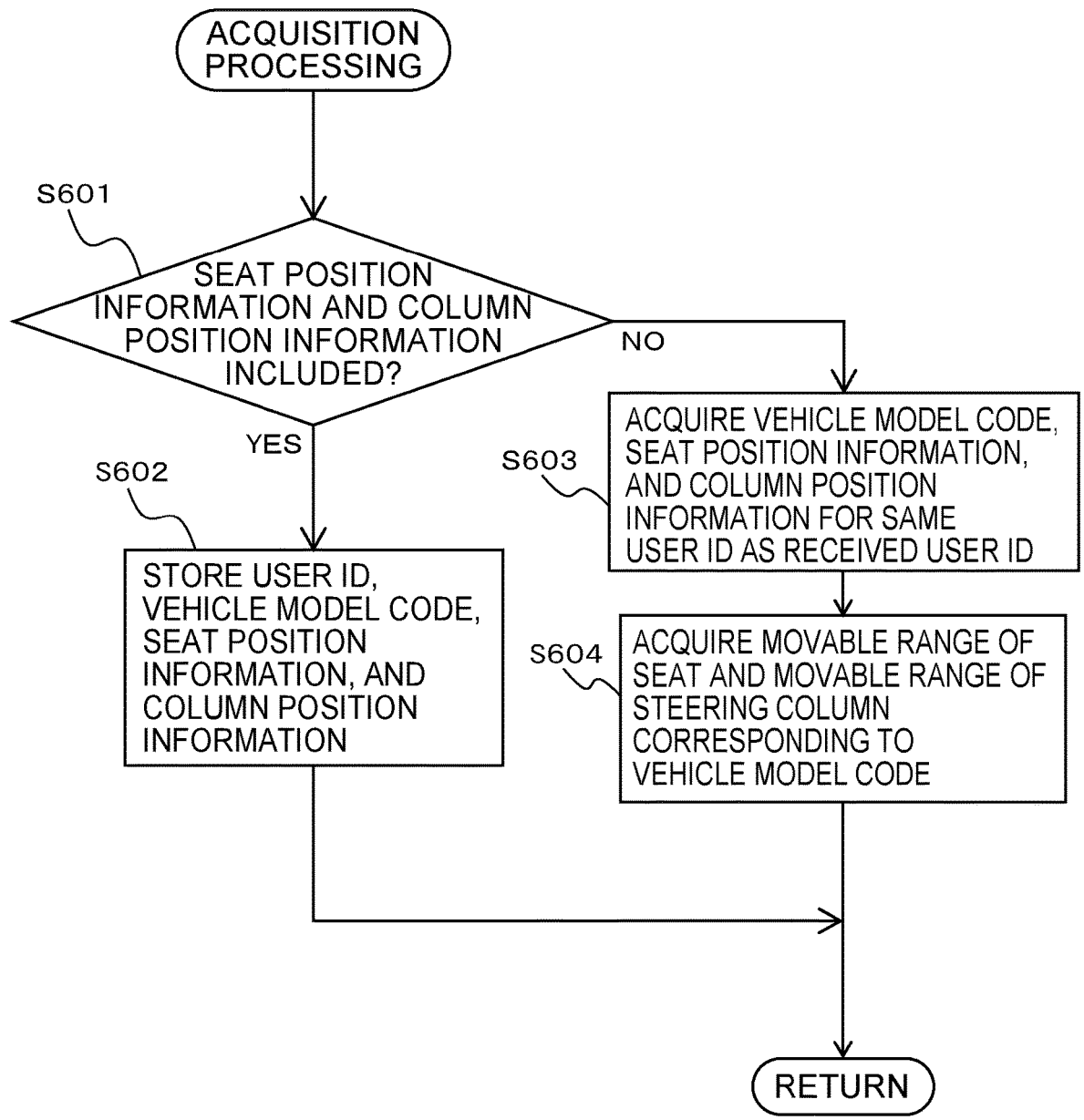
FIG. 7 is a flowchart illustrating a flow of acquisition processing of the first exemplary embodiment.
Figure 8:
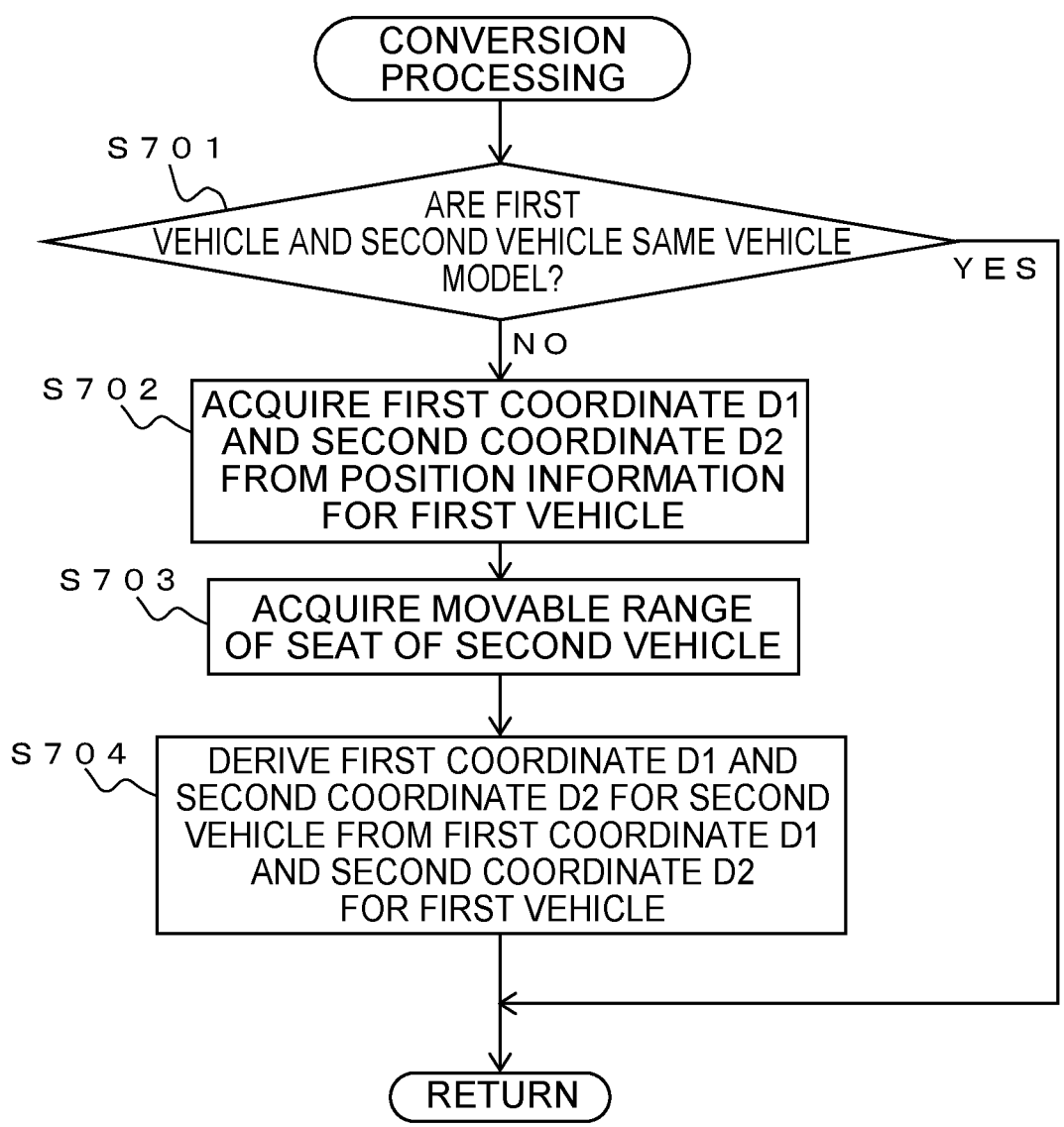
FIG. 8 is a flowchart illustrating a flow of conversion processing of the first exemplary embodiment.
Figure 9:
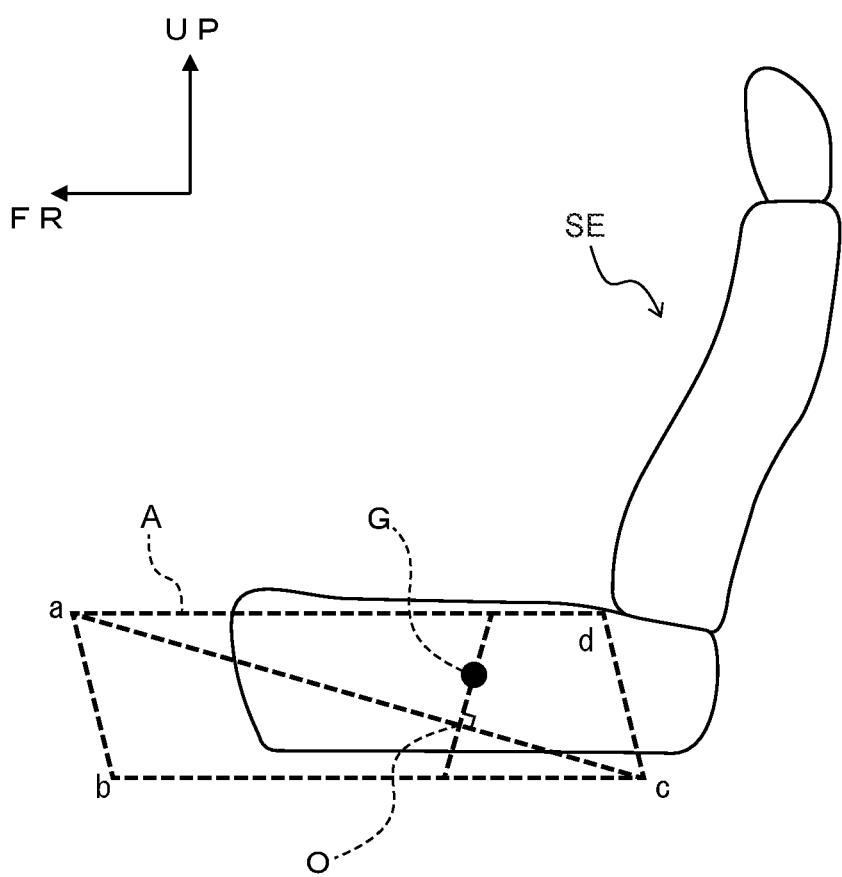
FIG. 9 is an outline diagram illustrating a movable range of a seat of a vehicle of the first exemplary embodiment.
Figure 10:
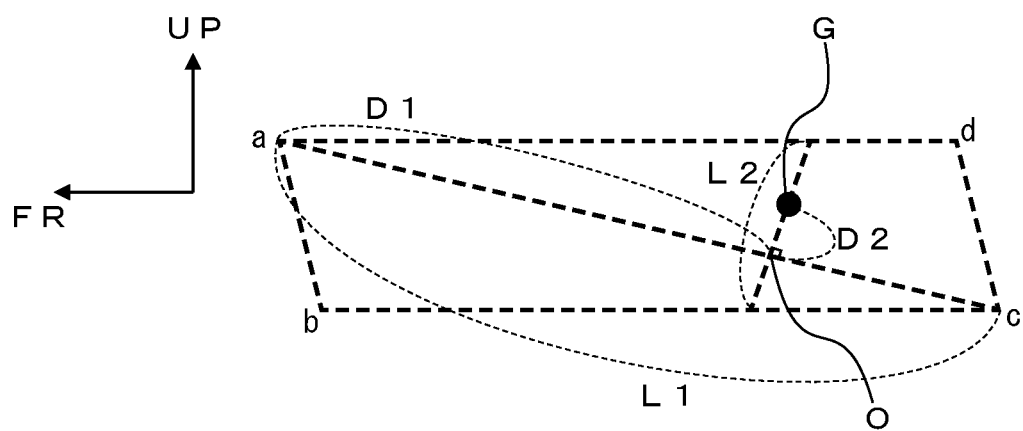
FIG. 10 is an outline diagram illustrating a coordinate system of a seat of a vehicle of the first exemplary embodiment.
Figure 11:
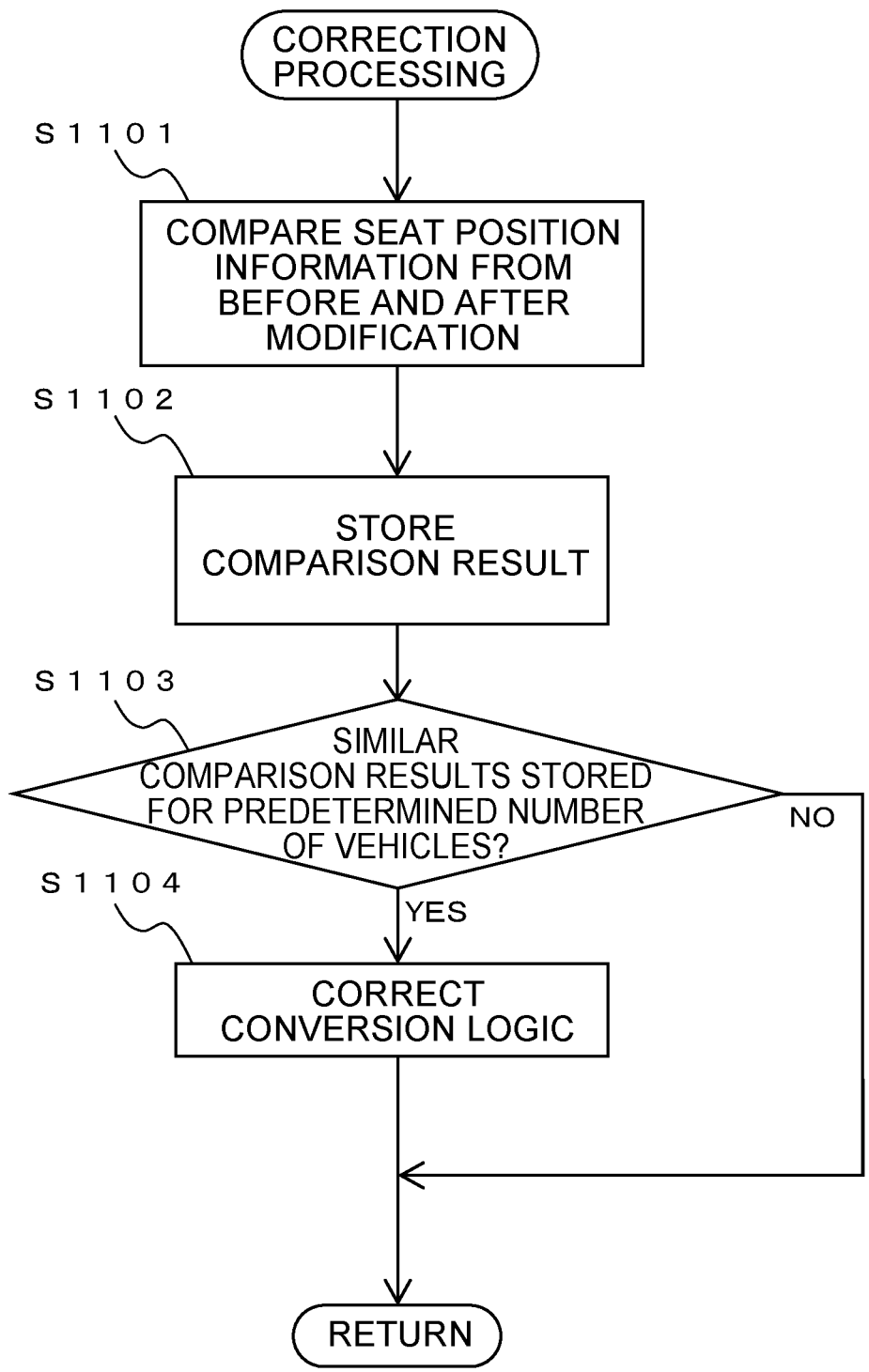
FIG. 11 is a flowchart illustrating a flow of correction processing of the first exemplary embodiment.

Next, explanation follows regarding a control sequence of the management system 1 according to the present exemplary embodiment, with reference to FIG. 6 to FIG. 11. FIG. 6 is a system sequence chart illustrating a flow of management processing of the present exemplary embodiment. FIG. 7 is a flowchart illustrating a flow of acquisition processing of the present exemplary embodiment. FIG. 8 is a flowchart illustrating a flow of conversion processing of the present exemplary embodiment. FIG. 9 and FIG. 10 are outline diagrams explaining the conversion processing of the present exemplary embodiment. FIG. 11 is a flowchart illustrating a flow of the correction processing of the present exemplary embodiment.

Explanation follows regarding a flow of management processing of the present exemplary embodiment, with reference to FIG. 6. In FIG. 6, for ease of explanation, a vehicle 20 that is ridden first is referred to as a first vehicle 20A, and a new vehicle 20 that is ridden subsequently is referred to as a second vehicle 20B. The first vehicle 20A and the second vehicle 20B are examples of vehicles, and are both vehicles 20 used by the same user. For example, the first vehicle 20A is the user's own car, and the second vehicle 20B is a rental car rented by the user while traveling. Alternatively, the first vehicle 20A may be the user's own car, and the second vehicle 20B may be a new car that the user has bought to replace the first vehicle 20A.

At S501, the DCM 230 of the first vehicle 20A communicates with the management server 10 to transmit the seat position information and column position information for the first vehicle 20A, as well as the vehicle model code and the user ID. This is initiated by the user inputting an instruction to an input device of the first vehicle 20A to start control to transfer over the seat position information and column position information. Note that this start trigger is merely an example, and another start trigger may be employed as appropriate.

At S502, the DCM 230 of the second vehicle 20B communicates with the management server 10 to transmit the vehicle model code and the user ID. This is initiated by the user inputting an instruction to an input device of the second vehicle 20B to start control to transfer over the seat position information and column position information. Note that this start trigger is merely an example, and another start trigger may be employed as appropriate.

At S503, the management server 10 executes acquisition processing to acquire information from both the first vehicle 20A and the second vehicle 20B. This acquisition processing is described in detail later.

At S504, the management server 10 executes conversion processing to convert the seat position information and column position information for the first vehicle 20A into seat position information and column position information for the second vehicle 20B.

At S505, the management server 10 provides to the second vehicle 20B the seat position information and column position information for the second vehicle 20B as obtained by the conversion processing.

At S506, the second vehicle 20B executes application processing. Specifically, the second vehicle 20B applies the seat position information and column position information received from the management server 10 through the DCM 230 to the onboard equipment 210 of the second vehicle 20B. The seat position information and column position information received by the DCM 230 of the second vehicle 20B is provided to the seat ECU 211a and the tilt-and-telescoping ECU 212a via the body ECU 220. The seat ECU 211a of the second vehicle 20B controls the motor 211b so as to move the seat SE based on the acquired seat position information. Similar control is performed by the tilt-and-telescoping ECU 212a.

At S507, in cases in which the position of the seat SE or the position of the steering column ST has been modified subsequent to application of the seat position information and column position information to the onboard equipment, the second vehicle 20B modifies the seat position information and column position information managed by the body ECU 220. This is for example performed in cases in which the position of the seat SE has been adjusted in response to the user operating the position adjustment lever 211d. Similar applies in the case of the steering column ST.

At S508, the DCM 230 of the second vehicle 20B communicates with the management server 10 to transmit the seat position information and column position information for the second vehicle 20B, as well as the vehicle model code and the user ID. This is initiated by the user inputting an instruction to the input device of the second vehicle 20B to provide feedback regarding the conversion processing to the management server 10. Note that this start trigger is merely an example, and another start trigger may be employed as appropriate. In the present exemplary embodiment, an example is given in which modified seat position information and column position information are transmitted to the management server 10. As another example, the body ECU 220 of the second vehicle 20B may compare the seat position information and column position information provided by the management server 10 against seat position information and column position information that have been modified following application of the seat position information and column position information provided by the management server 10, and transmit difference information identified by this comparison to the management server 10.

At S509, the management server 10 executes correction processing to correct the conversion logic based on the seat position information and column position information acquired from the second vehicle 20B. This correction processing is described in detail later.

Acquisition Processing

Explanation follows regarding a flow of acquisition processing of the present exemplary embodiment, with reference to FIG. 7. The management server 10 starts the acquisition processing in cases in which information has been received from a vehicle 20 such as the first vehicle 20A or the second vehicle 20B.

At S601, in cases in which information has been received from a vehicle 20, the CPU 120 of the management server 10 determines whether or not seat position information and column position information are included therein. In cases in which the CPU 120 determines that seat position information and column position information are included, processing proceeds to S602. In cases in which the CPU 120 determines that seat position information and column position information are not included, processing proceeds to S603. Note that in cases in which determination is made at S601 that seat position information and column position information are included, conversion processing is not subsequently executed.

At S602, the CPU 120 collects the seat position information and column position information, the vehicle model code, and the user ID in the settings data 150a corresponding to the onboard equipment 210 in the storage 150. After S602 has been executed, the CPU 120 ends the acquisition processing.

At S603, the CPU 120 acquires the seat position information, column position information, and vehicle model code associated with the received user ID from the settings data 150a. At S604, the CPU 120 acquires a movable range of the onboard equipment 210 corresponding to the acquired vehicle model code from the movable range data 150b.

In the following example, the seat position information is described as an example of setting information for the onboard equipment 210. However, similar processing may be executed for column position information, or setting information for other onboard equipment.

Conversion Processing

Next, explanation follows regarding the conversion processing of the present exemplary embodiment. FIG. 8 is a flowchart illustrating a flow of the conversion processing of the present exemplary embodiment. FIG. 9 and FIG. 10 are outline diagrams for explaining the conversion processing of the present exemplary embodiment.

First, explanation follows regarding the conversion logic employed in the conversion processing. The adjustable ranges of corresponding onboard equipment 210 will generally differ depending on the vehicle model. For example, a movable range of the seat SE will differ depending on the vehicle height, surrounding components, and so on. Thus, in the present disclosure, setting information for the onboard equipment 210 is converted based on a proportional ratio with respect to the movable range in each vehicle model. In cases in which a movable range is defined in one direction only, the same proportional ratio should be maintained with respect to the lengths of the movable ranges in this one direction. In cases in which a movable range is defined in two directions, the same proportional ratio should be maintained with respect to the lengths of the movable ranges in the two mutually intersecting directions. In cases in which the movable range is defined in three directions, the same proportional ratio should be maintained with respect to the lengths of the movable ranges in the three mutually intersecting directions. These directions may be any desired directions, and there is no limitation to a Cartesian coordinate system.

In the present exemplary embodiment, the CPU 120 converts the seat position information based on proportional ratios with respect to the movable ranges. Specifically, first, a proportional ratio with respect to the movable range is derived from the seat position information of the first vehicle 20A. Seat position information for the second vehicle 20B is then derived so as to have an equivalent proportional ratio with respect to the movable range.

Next, explanation follows regarding the movable range directions referred to in the present exemplary embodiment, with reference to FIG. 9 and FIG. 10. The seat position information is expressed in terms of a first coordinate and a second coordinate, as defined below.

FIG. 9 is an outline diagram illustrating the seat SE of the first vehicle 20A as viewed from one side. Note that similar applies to the second vehicle 20B. The seat SE of the first vehicle 20A is movable in the vertical direction and front-rear direction of the vehicle. When a representative position on the seat SE is denoted point G, A is a movable range of the point G. A reference plane of the movable range A lies in the vertical and front-rear directions of the vehicle, and the movable range A has a parallelogram shape with an acute angle at the vehicle upper front side. Respective vertices of the parallelogram are denoted a, b, c, and d. The vertex on the vehicle upper front side of the movable range A is denoted point a, the vertex on the vehicle lower front side of the movable range A is denoted point b, the vertex on the vehicle lower rear side of the movable range A is denoted point c, and the vertex on the vehicle upper rear side of the movable range A is denoted point d. A diagonal line linking the points a and c is denoted a diagonal line ac, and an intersection point between a line running through the point G and the diagonal line ac so as to be perpendicular to the diagonal line ac is denoted a point O.

FIG. 10 is an outline diagram for explaining the respective vertices and lines of the movable range. The length of the diagonal line ac is denoted L1, and the length of the line perpendicular to the diagonal line ac is denoted L2. A length between the point a and the point O is denoted D1, and a length between the point O and the point G is denoted D2. When expressed using a coordinate system in which the direction of the diagonal line ac is a first direction and the direction orthogonal the diagonal line ac at the point O is a second direction, the coordinates of the point G that is the standard point of the seat SE can be expressed in the form (D1, D2). In these coordinates of the point G, D1 is referred to as a first axis, and D2 is referred to as a second axis.

Note that the first axis corresponds to a direction of adjustment according to the build of the user. The smaller the build of the user, the higher the position of the seat SE, such that the seat SE is moved closer toward the steering column ST. The larger the build of the user, the further the seat SE is moved away from the steering column ST. Namely, the position of the seat SE tends to be moved toward the front and upper sides of the movable range of the seat SE by users that have a smaller build, whereas the position of the seat SE tends to be moved toward the rear and lower sides of the movable range of the seat SE by users that have a larger build. Thus, setting the diagonal line ac that links the point a at the upper front vertex to the point c at the lower rear vertex of the movable range of the seat SE as the first coordinate enables a coordinate that reflects the build of the user to be obtained. The second coordinate represents an adjustment direction that reflects a preference of the user. By defining the first coordinate and the second coordinate in the above manner, the position of the seat SE can be broken down into a direction that reflects the build of the user and a direction that reflects the preference of the user in the obtained coordinates.

Although the first coordinate and the second coordinate are defined in the above manner in the present exemplary embodiment, the coordinates may be set according to the movable directions of the seat SE. Were the coordinate system to be set arbitrarily, it would be necessary to adjust from the coordinate system to the movable directions of the seat SE in order to reflect the position of the seat SE. Setting the coordinates according to the movable directions of the seat SE enables such adjustments to be omitted.

Conversion processing is executed based on the points defined above to convert the seat position information from position information corresponding to the first vehicle 20A to position information corresponding to the second vehicle 20B. Explanation follows regarding this conversion processing, with reference to FIG. 8.

At S701, the CPU 120 of the management server 10 determines whether or not the first vehicle 20A and the second vehicle 20B are the same vehicle model. Determination as to whether or not the vehicles are the same vehicle model may be performed by comparing the vehicle model codes. In cases in which the first vehicle 20A and the second vehicle 20B are the same vehicle model (YES at S701), the CPU 120 ends the conversion processing. In cases in which the first vehicle 20A and the second vehicle 20B are not the same vehicle model (NO at S701), processing proceeds to S702.

At S702, the CPU 120 of the management server 10 acquires the first coordinate D1 and the second coordinate D2 from the seat position information for the first vehicle 20A.

At S703, the CPU 120 acquires the movable range A of the seat SE of the second vehicle 20B from the storage 150. Specifically, the CPU 120 acquires the length L1 of the diagonal line ac and the length L2 of the line perpendicular to the diagonal line ac.

At S704, the CPU 120 derives the first coordinate D1 and the second coordinate D2 for the second vehicle 20B from the first coordinate D1 and the second coordinate D2 for the first vehicle 20A. A proportional ratio of the first coordinate D1 for the first vehicle 20A with respect to the length L1 of the diagonal line ac is derived, and the derived proportional ratio is multiplied by the length L1 of the diagonal line ac of the second vehicle 20B to derive the first coordinate D1 for the second vehicle 20B. Similarly, a proportional ratio of the second coordinate D2 for the first vehicle 20A with respect to the length L2 of the line perpendicular to diagonal line ac is derived, and the derived proportional ratio is multiplied by the length L2 of the line perpendicular to the diagonal line ac of the second vehicle 20B to derive the second coordinate D2 for the second vehicle 20B.

The above configuration enables the CPU 120 to convert the position information corresponding to the first vehicle 20A to position information corresponding to the second vehicle 20B.

Correction Processing

Explanation follows regarding a flow of correction processing of the present exemplary embodiment, with reference to FIG. 11. After having executed provision processing, the management server 10 later initiates the correction processing in cases in which seat position information has been acquired from the second vehicle 20B.

At S1101, the CPU 120 compares the seat position information provided to the second vehicle 20B against the modified seat position information acquired from the second vehicle 20B. Movement directions and movement distances corresponding to the modification of the seat SE position in the second vehicle 20B are thereby obtained.

At S1102, the CPU 120 causes a comparison result to be stored as comparison data 150c in the storage 150. As an example, the movement directions and movement distances of the seat SE obtained at S1101 are classified into two directions, these being a front-rear direction and a vertical direction, and saved as the comparison result. Further classification may be performed based on the combination of vehicle model codes before and after the conversion processing. Note that this classification method is merely an example. Alternatively, classification may be performed based on only the vehicle model code after conversion processing.

At S1103, the CPU 120 determines whether or not similar comparison results have been stored for a predetermined number of vehicles or greater. For example, the CPU 120 determines whether or not comparison results for the same vehicle model code combination and movement in the same movement directions has been stored for a predetermined number of vehicles. In cases in which determination is YES at S1103, processing proceeds to S1104. In cases in which determination is NO at S1103, the correction processing is ended.

At S1104, the CPU 120 corrects the conversion logic based on the comparison result. For example, the CPU 120 applies additional processing during the conversion processing based on the comparison result. For example, in cases in which users have a tendency to move the seat SE further toward the front following the provision of seat position information, additional processing may be performed after execution of S704 of the conversion processing in order to modify the first coordinate and the second coordinate for the second vehicle 20B in accordance with this movement toward the front. The movement amount applied may be obtained by averaging movement amounts in data representing a similar trend in the stored comparison data 150c. Alternatively, instead of an average, a predetermined constant may be employed as the movement amount. Additional processing may be applied to the first coordinate and the second coordinate of the first vehicle 20A after S702, or additional processing may be applied to the first coordinate and the second coordinate for the second vehicle 20B derived at S704. Alternatively, the movable range of the seat SE, or the derivation processing of S704 itself, may be modified. After the processing of S1104 has been executed, the correction processing is ended, and processing returns to the management processing.

The conversion logic of the conversion processing is corrected by the correction processing described above. This enables a result of modification of the onboard equipment by the user to be reflected in the conversion logic in addition to the conversion performed based on the movable range of the vehicle model.

Operation and Advantageous Effects

In the present exemplary embodiment, the CPU 120 of the management server 10 converts the seat position information and column position information for the first vehicle 20A into seat position information and column position information for the second vehicle 20B based on the vehicle model code of the first vehicle 20A and the vehicle model code of the second vehicle 20B, and provides this converted information to the second vehicle 20B. This enables onboard equipment settings unconstrained by vehicle model to be provided in cases in which onboard equipment settings are transferred between different vehicles. Furthermore, the seat position information and column position information provided by the management server 10 can be replicated as-is in the seat SE and the steering column ST without requiring the second vehicle 20B to perform processing to convert the seat position information and column position information for application to the second vehicle 20B.

Moreover, the CPU 120 of the management server 10 of the present exemplary embodiment converts the seat position information for the first vehicle 20A into seat position information for the second vehicle 20B based on proportional ratios with respect to the respective movable ranges A of the seats SE. This enables the settings of the seats SE to be replicated unconstrained by vehicle model, even if the movable ranges of the seats SE differ according to vehicle model.

Moreover, the management server 10 of the present exemplary embodiment splits the seat position information for the first vehicle 20A into the mutually intersecting first coordinate D1 and second coordinate D2, and employs proportional ratios with respect to the lengths L1, L2 configuring the movable range of the respective coordinates in order to convert the seat position information into seat position information for the second vehicle 20B. Thus, for seats SE with movable ranges defined by directions in two dimensions, seat position information can be converted into seat position information for the second vehicle 20B while taking into consideration differences in the movable ranges according to the vehicle model.

In particular, in the present exemplary embodiment, the coordinate system is set in two directions, these being the diagonal direction linking the upper front side and the lower rear side of the movable range of the seat SE, and the direction perpendicular to this diagonal direction. In this manner, a coordinate system can be set that is split between a direction reflecting the build of the user and a direction reflecting a preference of the user.

Moreover, in the present exemplary embodiment, in cases in which the vehicle model code of the first vehicle 20A and the vehicle model code of the second vehicle 20B are the same, the seat position information and column position information are transferred to the second vehicle 20B without executing conversion processing thereon. This enables the computational load on the management server 10 to be lessened.

Moreover, in the present exemplary embodiment, after the seat position information and column position information have been converted and transferred over, in cases in which the user further modifies the position of the seat SE or the steering column ST, the management server 10 may correct the conversion logic. By applying conversion logic that has been optimized based on such subsequent user modifications to the setting information for the onboard equipment, the management server 10 serving as a management device enables user burden in readjusting the onboard equipment to be alleviated.

Modified Example of First Exemplary Embodiment

In the above exemplary embodiment, the conversion processing is executed in cases in which seat position information and column position information have not been received from the second vehicle 20B, so as to convert the setting information for the onboard equipment 210 of the first vehicle 20A using proportional ratios with respect to the movable range of the onboard equipment 210 of the first vehicle 20A. As a modified example, the conversion processing may be executed in cases in which seat position information and column position information have been received from the first vehicle 20A. In such cases, the management server 10 need only collect the user ID and the proportional ratios with respect to the movable ranges of the seat position information and column position information in the storage 150. In cases in which this user ID and a different vehicle model code are subsequently acquired from the second vehicle 20B, the proportional ratios with respect to the movable ranges of the seat position information and column position information that have been collected in the storage 150 may then be converted into setting information for the onboard equipment 210 corresponding to the vehicle model of the second vehicle 20B.

Second Exemplary Embodiment

In a management system 1 according to a second exemplary embodiment, seat position information and column position information is converted in vehicle 20. Explanation follows regarding points that differ to the first exemplary embodiment. Note that configuration that is the same as that in the first exemplary embodiment is allocated the same reference numerals, and detailed explanation thereof is omitted.

Hardware Configuration of Body ECU

Figure 12:
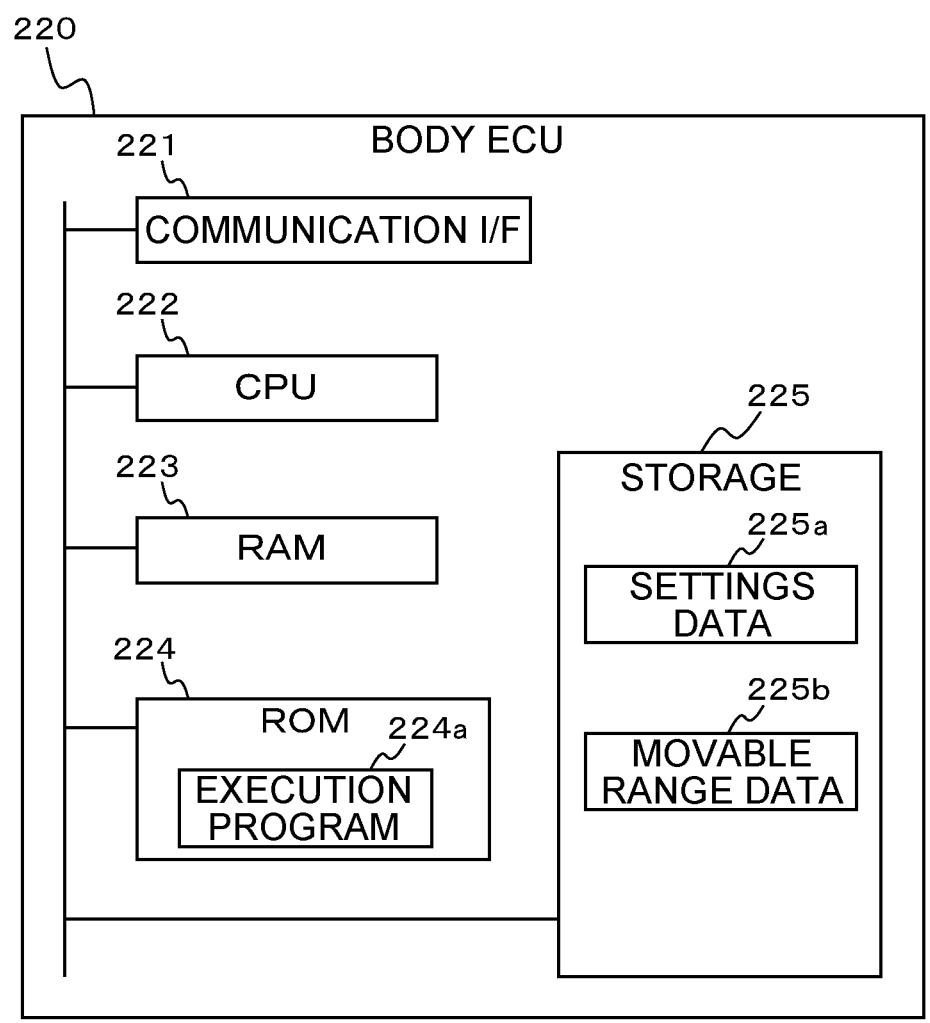
FIG. 12 is a block diagram illustrating a hardware configuration of a body ECU of a second exemplary embodiment.

Explanation follows regarding a hardware configuration of the body ECU 220 of the vehicles 20, with reference to FIG. 12. The body ECU 220 is configured including a communication I/F 221, a CPU 222, RAM 223, ROM 224, and storage 225. The communication I/F 221, the CPU 222, the RAM 223, the ROM 224, and the storage 225 are connected so as to be capable of communicating with each other through an internal bus. In the present exemplary embodiment, the body ECU 220 is an example of a management device.

The CPU 222 reads an execution program 224a from the ROM 224, and executes the execution program 224a using the RAM 223 as a workspace.

Settings data 225a and movable range data 225b for the onboard equipment 210 are stored in the storage 225 of the present exemplary embodiment. In this example, the settings data 225a refers to position information for the seat SE and position information for the steering column ST of an own vehicle (vehicle 20). The movable range data 225b is information relating to the movable range of the seat SE and the movable range of the steering column ST of the own vehicle (vehicle 20).

The communication I/F 221 is an interface that is electrically connected to the DCM 230, the seat ECU 211a, and the tilt-and-telescoping ECU 212a.

In the present exemplary embodiment, the CPU 222 reads the execution program 224a from the ROM 224, and executes the execution program 224a using the RAM 223 as a workspace.

Functional Configuration of Body ECU

Figure 13:
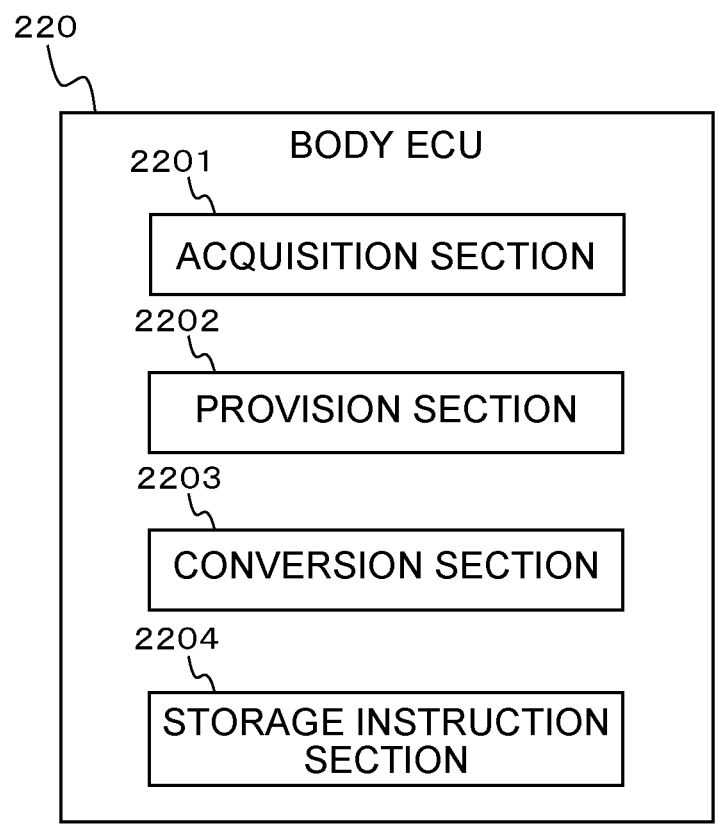
FIG. 13 is a block diagram illustrating an example of functional configuration of a body ECU of the second exemplary embodiment.

Explanation follows regarding a functional configuration of the body ECU 220, with reference to FIG. 13. The body ECU 220 includes an acquisition section 2201, a provision section 2202, a conversion section 2203, and a storage instruction section 2204. The acquisition section 2201, the provision section 2202, the conversion section 2203, and the storage instruction section 2204 are functional configuration elements implemented by the execution program 224a stored in the ROM 224 being read into the RAM 223 and executed by the CPU 222.

The acquisition section 2201 and the provision section 2202 exchange seat position information and column position information with the DCM 230, the seat ECU 211a, and the tilt-and-telescoping ECU 212a. The storage instruction section 2204 causes the seat position information and column position information acquired by the acquisition section 2201 to be stored in the storage 225.

The conversion section 2203 executes first conversion processing using a first conversion logic, and executes second conversion processing using a second conversion logic. The first conversion logic converts the seat position information and column position information of an own vehicle into model non-specific seat position information and column position information. The second conversion logic converts the model non-specific seat position information and column position information into seat position information and column position information for application to an own vehicle.

Hardware Configuration of Management Server

The storage 150 of the management server 10 according to the second exemplary embodiment stores the settings data 150a for the onboard equipment 210. The settings data 150a for the onboard equipment 210 is information in which model non-specific seat position information and column position information that have been converted in vehicle 20 are stored for each user ID. In the present exemplary embodiment, the vehicle model information is not included in the settings data 150a for the onboard equipment 210.

Control Flow

Figure 14:
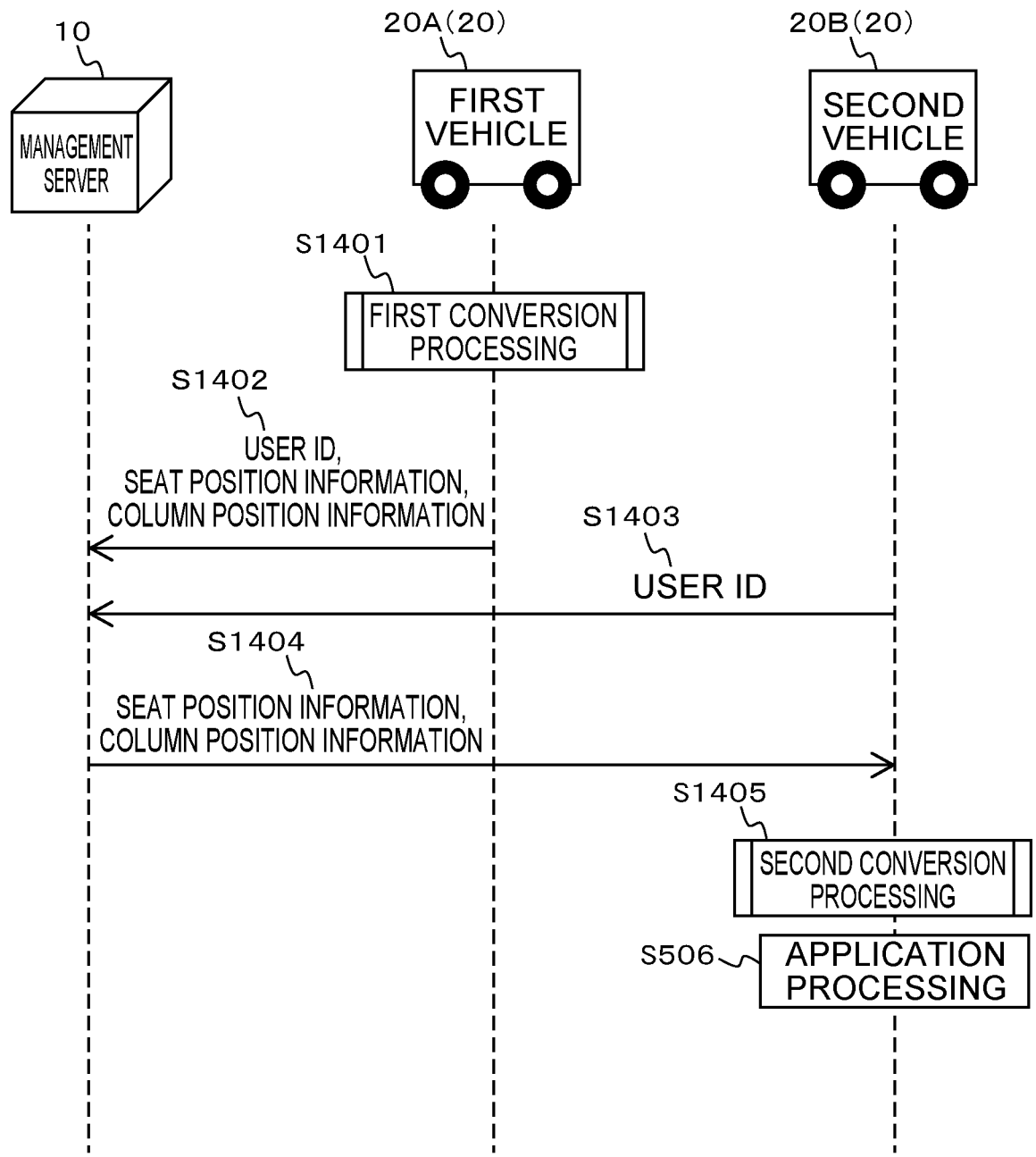
FIG. 14 is a system sequence chart illustrating a flow of management processing of the second exemplary embodiment.
Figure 15:
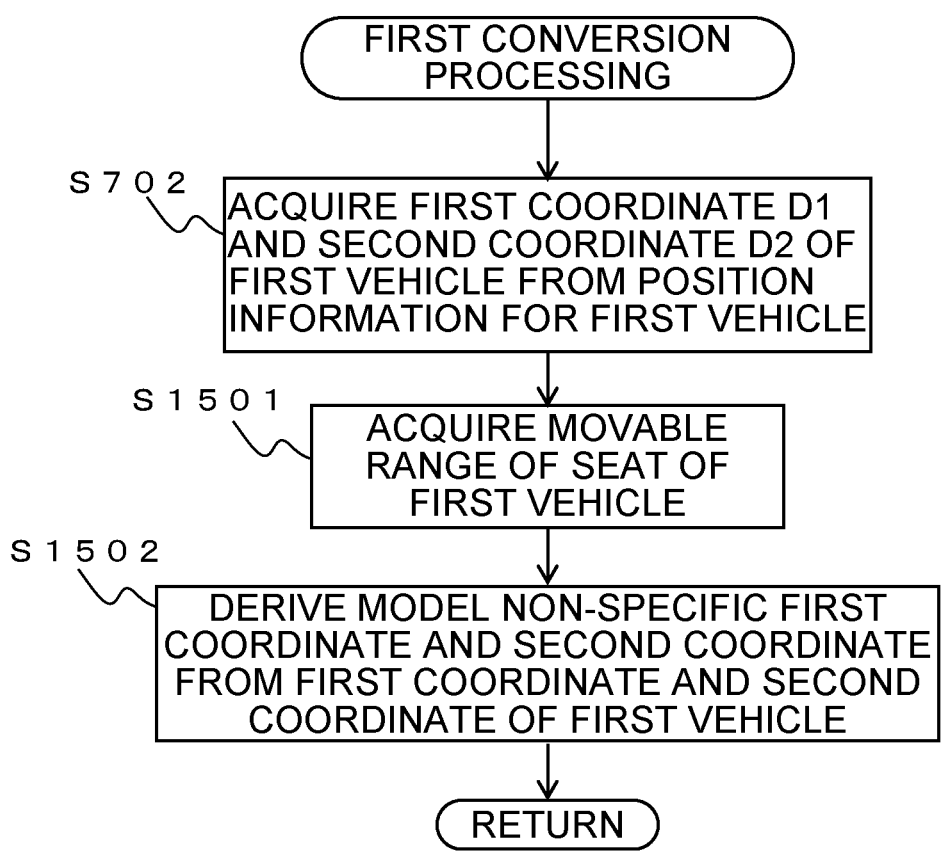
FIG. 15 is a flowchart illustrating a flow of first conversion processing of the second exemplary embodiment.
Figure 16:
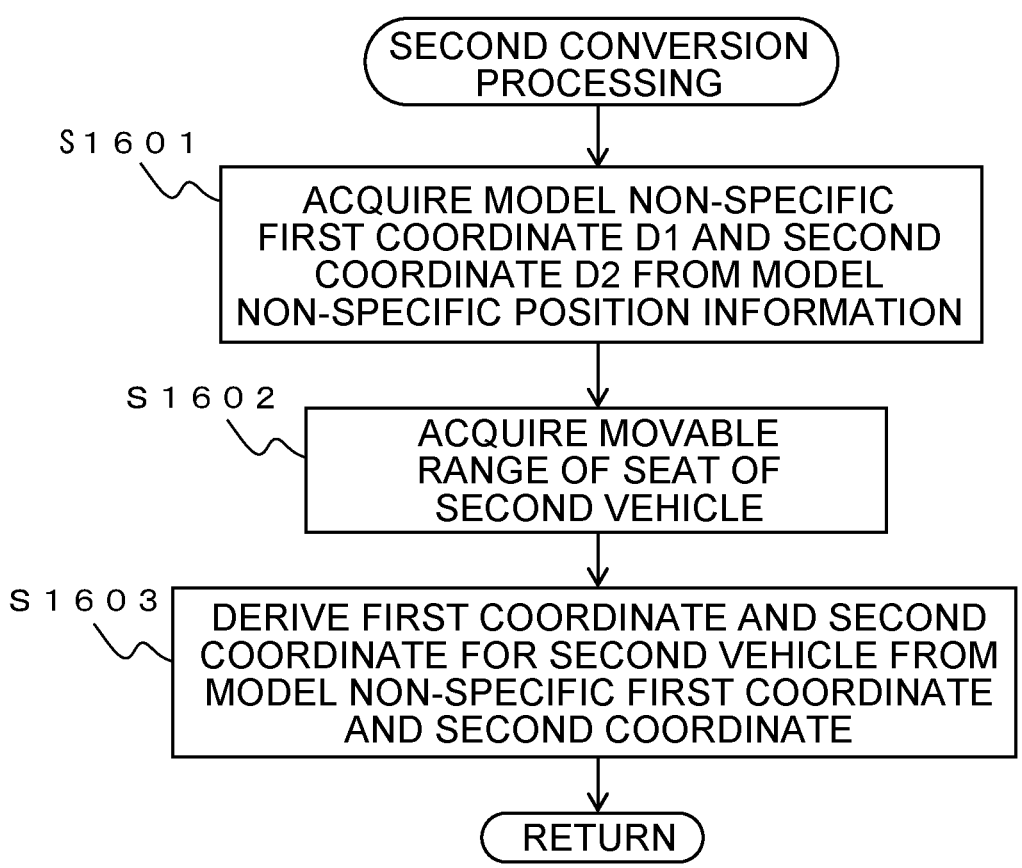
FIG. 16 is a flowchart illustrating a flow of second conversion processing of the second exemplary embodiment.

Next, explanation follows regarding a control sequence of the management system 1 according to the present exemplary embodiment, with reference to FIG. 14 to FIG. 16. FIG. 14 is a system sequence chart illustrating a flow of management processing of the present exemplary embodiment. FIG. 15 is a flowchart illustrating a flow of first conversion processing of the present exemplary embodiment. FIG. 16 is a flowchart illustrating a flow of second conversion processing of the present exemplary embodiment.

Explanation follows regarding a flow of management processing of the present exemplary embodiment, with reference to FIG. 14. Similarly to in the first exemplary embodiment, explanation follows with reference to a first vehicle 20A and a second vehicle 20B. FIG. 14 illustrates an example in which the first conversion processing is executed in the first vehicle 20A, and the second conversion processing is executed in the second vehicle 20B.

At S1401, the first vehicle 20A executes the first conversion processing. The first vehicle 20A thereby obtains model non-specific seat position information and column position information based on the seat position information and column position information of this vehicle. At S1402, the DCM 230 of the first vehicle 20A communicates with the management server 10 to transmit the model non-specific seat position information and column position information, as well as the user ID.

At S1403, the DCM 230 of the second vehicle 20B communicates with the management server 10 to transmit the user ID.

At S1404, the management server 10 provides the second vehicle 20B with the model non-specific seat position information and column position information that corresponds to the user ID received from the second vehicle 20B.

At S1405, the second vehicle 20B executes the second conversion processing. The second vehicle 20B thereby obtains seat position information and column position information for the second vehicle 20B based on the acquired model non-specific seat position information and column position information. At S506, the second vehicle 20B applies the seat position information and column position information obtained by the second conversion processing to the seat SE and steering column ST of the second vehicle 20B.

First Conversion Processing

Next, explanation follows regarding the first conversion processing of the present exemplary embodiment. The first conversion processing is executed by the first vehicle 20A. FIG. 15 is a flowchart illustrating a flow of the first conversion processing of the present exemplary embodiment. Note that although seat position information is described as an example of setting information for the onboard equipment 210, similar processing may be executed for column position information, or setting information for other onboard equipment.

At S702, the CPU 222 of the body ECU 220 acquires the first coordinate D1 and the second coordinate D2 from the seat position information. At S1501, the CPU 222 acquires the movable range A of the seat SE of the first vehicle 20A. Specifically, the CPU 222 acquires the length L1 of the diagonal line ac and the length L2 of the line perpendicular to the diagonal line ac.

At S1502, the CPU 222 derives a model non-specific first coordinate D1 and second coordinate D2 from the first coordinate D1 and the second coordinate D2 of the first vehicle 20A. Specifically, a proportional ratio of the first coordinate D1 of the first vehicle 20A with respect to the length L1 of the diagonal line ac, namely a model non-specific first coordinate D1, is derived. Similarly, a proportional ratio of the second coordinate D2 of the first vehicle 20A with respect to the length L2 of the line perpendicular to the diagonal line ac, namely a model non-specific second coordinate D2, is derived.

The CPU 222 derives model non-specific seat position information from the seat position information corresponding to the first vehicle 20A using the above-described methodology.

Second Conversion Processing

Next, explanation follows regarding the second conversion processing of the present exemplary embodiment, with reference to FIG. 16. The second conversion processing is executed by the second vehicle 20B.

At S1601, the CPU 222 of the body ECU 220 acquires the model non-specific first coordinate D1 and second coordinate D2 from the model non-specific seat position information acquired from the management server 10 through the DCM 230. At S1602, the CPU 222 acquires the movable range A of the seat SE of the second vehicle 20B. Specifically, the CPU 222 acquires the length L1 of the diagonal line ac and the length L2 of the line perpendicular to this diagonal line ac.

At S1603, the CPU 222 derives a first coordinate D1 and a second coordinate D2 for the second vehicle 20B from the model non-specific first coordinate D1 and second coordinate D2. Specifically, the length L1 of the diagonal line ac of the second vehicle 20B is multiplied by the proportional ratio representing the model non-specific first coordinate D1 to derive the first coordinate D1 of the second vehicle 20B. Similarly, the length L2 of the line perpendicular to the diagonal line ac of the second vehicle 20B is multiplied by the proportional ratio representing the model non-specific second coordinate D2 to derive the second coordinate D2 of the second vehicle 20B.

In the present exemplary embodiment, the vehicle 20 is provided with both the first conversion logic and the second conversion logic for converting to and from the seat position information and column position information of the own vehicle and the model non-specific seat position information and column position information. There is accordingly no need for the management server 10 to manage both the vehicle model codes and movable ranges according to vehicle model, thereby enabling the capacity of the storage 150 of the management server 10 to be reduced.

Third Exemplary Embodiment

In a management system 1 according to a third exemplary embodiment, the seat position information and column position information for the first vehicle 20A are converted into seat position information and column position information for the second vehicle 20B in the first vehicle 20A. Note that the hardware configuration and functional configuration of the vehicles 20 and the hardware configuration and functional configuration of the management server 10 are similar to those in the second exemplary embodiment, and so detailed explanation thereof is omitted.

Control Flow

Figure 17:
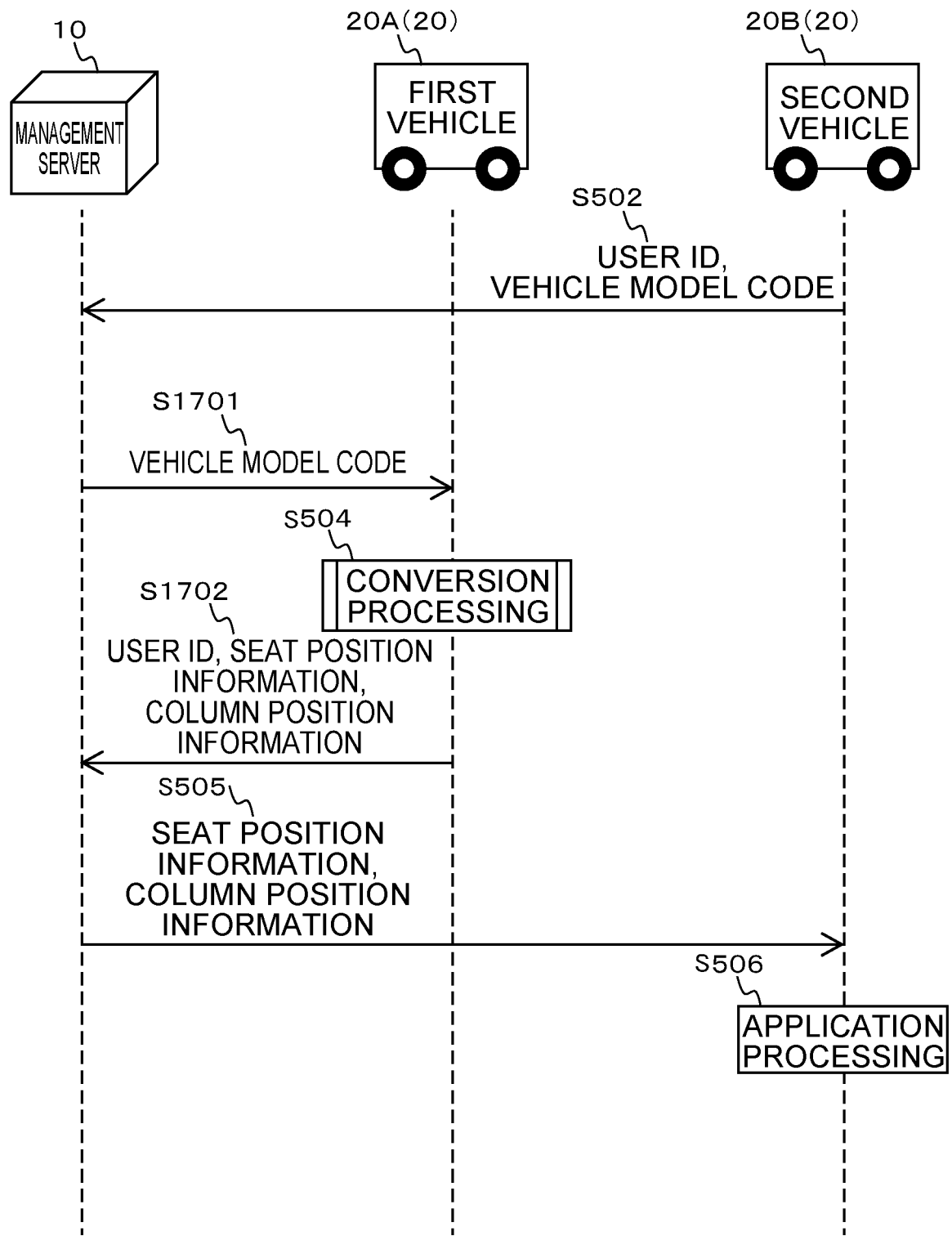
FIG. 17 is a system sequence chart illustrating a flow of management processing of a third exemplary embodiment.

Next, explanation follows regarding a flow of management processing according to the present exemplary embodiment, with reference to FIG. 17. At S502, the second vehicle 20B transmits the user ID and the vehicle model code to the management server 10. At S1701, the management server 10 provides the vehicle model code of the second vehicle 20B to the first vehicle 20A that corresponds to the user ID acquired from the second vehicle 20B. At S504, the first vehicle 20A executes conversion processing. Specifically, the CPU of the first vehicle 20A converts the seat position information and column position information for the first vehicle 20A into seat position information and column position information for the second vehicle 20B (see FIG. 8). At S1702, the first vehicle 20A transmits the user ID, and the converted seat position information and column position information to the management server 10. At S505, the management server 10 provides the seat position information and column position information for the second vehicle 20B to the second vehicle 20B corresponding to the user ID acquired from the first vehicle 20A. At S506, application processing is executed by the second vehicle 20B.

In the present exemplary embodiment, the first vehicle 20A converts the seat position information and column position information for the first vehicle 20A into seat position information and column position information for the second vehicle 20B. This seat position information and column position information for the second vehicle 20B is provided to the second vehicle 20B via the management server 10. This enables the second vehicle 20B to replicate the provided position information as-is in the seat SE and the steering column ST, without requiring the second vehicle 20B to perform processing to convert the seat position information and column position information for application to the second vehicle 20B.

Note that although information provision is performed between the first vehicle 20A and the second vehicle 20B by communication via the management server 10 in the present exemplary embodiment, there is no limitation thereto. Information provision may be performed between the first vehicle 20A and the second vehicle 20B directly.

REMARKS

Although examples have been described in which the management server 10 manages onboard equipment setting information for plural users in the above exemplary embodiments, the management server 10 may take the form of mobile terminals such as smartphones in the possession of individual users. In such cases, the management server 10 does not have to perform management for every user ID, enabling the storage capacity to be reduced.

Although examples have been described in which the communication I/F 110 of the management server 10 and the DCM 230 of each of the vehicles 20 perform wireless communication over the network N in the above exemplary embodiments, various information may be exchanged through wired communication with mobile terminals such as smartphones in the possession of individual users. This enables information exchange to be implemented regardless of the wireless communication environment.

Although examples have been described in which the seat SE and the steering column ST serve as examples of the onboard equipment 210 in the above exemplary embodiments, the type of onboard equipment 210 is not limited thereto. Moreover, although configurations have been described in which the seat position information and column position information are stored and managed in the body ECU 220 in the above exemplary embodiments, this information may be respectively stored in the seat ECU 211a and the tilt-and-telescoping ECU 212a. Moreover, although an example has been described in which the settings data, movable range data, and comparison data are stored separately, this data structure is merely an example.

Note that the respective processing executed by the CPUs 120, 222 reading and executing the respective execution programs 140a, 224a in the above exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The respective processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

In the above exemplary embodiments, the execution programs 140a, 224a are in a format pre-stored (installed) in a computer-readable non-transitory storage medium. For example, the execution programs 140a, 224a are pre-stored in the ROMs 140, 224 of the management server 10 and the body ECU 220. However, there is no limitation thereto, and the respective programs may be provided in a format recorded on a non-transitory recording medium such as compact disc read only memory (CD-ROM), digital versatile disc read only memory (DVD-ROM), or universal serial bus (USB) memory. Alternatively, the respective programs may be provided in a format downloadable from an external device through the network N.

The above exemplary embodiments are described in order to facilitate understanding of the present disclosure, and are not to be construed as limitations of the present disclosure. The processing flows described in the above exemplary embodiments are merely examples, and superfluous steps may be omitted, new steps may be added, or the processing sequences may be changed within a range not departing from the spirit of the present disclosure. Some of the characteristics of the above exemplary embodiments may be combined as appropriate. Namely, the respective elements described in the above exemplary embodiments are concepts encompassing any design modifications and equivalents falling within the technical scope of the present disclosure.

What is claimed is:

1. A management device, comprising:
a processor configured to:
acquire, from a first vehicle, first setting information for first onboard equipment used by a user in the first vehicle, first vehicle model information for the first vehicle, and identification information for the user;
in a case in which the user operates a second vehicle, acquire at least the identification information from the second vehicle;
convert the first setting information into second setting information for second onboard equipment used by the user in the second vehicle based on the at least the identification information;
provide the second setting information to the second onboard equipment;
acquire information regarding a movable range of the first onboard equipment as the first vehicle model information; and convert the first setting information to the second setting information by applying a proportional ratio, defined as a parameter of the first setting information with respect to the movable range of the first onboard equipment, to a movable range of the second onboard equipment.

2. The management device of claim 1, wherein the processor is further configured to:
acquire second vehicle model information of the second vehicle; and
convert the first setting information into the second setting information by employing the second vehicle model information.

3. A vehicle, comprising:
the management device of claim 1.

4. A management system, comprising:
the management device of claim 1; and
a plurality of the first vehicle, which perform communication with the management device,
the processor being configured to:
acquire the first vehicle model information, the first setting information, and the identification information from the plurality of first vehicles by communication with the plurality of first vehicles,
acquire second vehicle model information for the second vehicle and the identification information from second new vehicle by communication with the second vehicle, and
provide the second onboard equipment with the second setting information by communication with the second vehicle.

5. The management device of claim 1, wherein the processor is further configured to, after converting the first setting information to the second setting information and in a case in which a position of the second onboard equipment is modified by the user, correct a conversion logic for conversion to the second setting information.

6. The management device of claim 5, wherein the processor is further configured to correct the conversion logic by an instruction for feedback from the user.

7. The management device of claim 5, wherein the processor is further configured to correct the conversion logic in a case in which a result has been stored for a predetermined number of times, the result being that a same combination of the first vehicle model information and second vehicle model information and movement in a same movement direction of the second onboard equipment is stored.

8. A method by which a computer executes processing, the processing comprising:
acquisition processing to acquire, from a first vehicle, first setting information for first onboard equipment used by a user in the first vehicle, first vehicle model information for the first vehicle, and identification information for the user;
in a case in which the user operates a second vehicle, acquisition processing to acquire at least the identification information from the second vehicle;
conversion processing to convert the first setting information into second setting information for second onboard equipment used by the user in the second vehicle based on the at least the identification information;
provision processing to provide the second setting information to the second onboard equipment;
acquisition processing to acquire information regarding a movable range of the first onboard equipment as the first vehicle model information; and
conversion processing to convert the first setting information to the second setting information by applying a proportional ratio, defined as a parameter of the first setting information with respect to the movable range of the first onboard equipment, to a movable range of the second onboard equipment.

9. A non-transitory storage medium storing a program executable by a computer to perform processing, the processing comprising:
acquisition processing to acquire, from a first vehicle, first setting information for first onboard equipment used by a user in the first vehicle, first vehicle model information for the first vehicle, and identification information for the user;
in a case in which the user operates a second vehicle, acquisition processing to acquire at least the identification information from the second vehicle;
conversion processing to convert the first setting information into second setting information for second onboard equipment used by the user in the second vehicle based on the at least the identification information;
provision processing to provide the second setting information to the second onboard equipment;
acquisition processing to acquire information regarding a movable range of the first onboard equipment as the first vehicle model information; and
conversion processing to convert the first setting information to the second setting information by applying a proportional ratio, defined as a parameter of the first setting information with respect to the movable range of the first onboard equipment, to a movable range of the second onboard equipment.

* * * * *